United States Patent

Wolfe

[15] 3,681,575

[45] Aug. 1, 1972

[54] TAPE POSITION MARKING AND SENSING DEVICE

[72] Inventor: Earnest C. Wolfe, Kanbe Mansion 1-B, Minami-Azabu 5-2-24, Minatu-ku, Tokyo, Japan

[22] Filed: July 22, 1969

[21] Appl. No.: 843,534

[52] U.S. Cl.......235/92 PE, 235/92 MP, 235/92 CT, 235/92 R, 235/103, 340/259, 235/132

[51] Int. Cl............................................H03k 21/36

[58] Field of Search.......................235/92, 103, 132; 33/137–139; 274/1; 242/55.11; 340/259

[56] References Cited

UNITED STATES PATENTS

| | | | |
|---|---|---|---|
| 2,756,279 | 7/1956 | Lang | 235/103 X |
| 2,944,750 | 7/1960 | Hall | 235/103 X |
| 3,251,039 | 5/1966 | Dupy et al. | 235/92 |
| 3,370,286 | 2/1968 | Buss | 340/259 |
| 3,207,432 | 9/1965 | Rupp et al | 235/132 X |

*Primary Examiner*—Thomas A. Robinson
*Assistant Examiner*—Joseph M. Thesz, Jr.
*Attorney*—Robert E. Breidenthal

[57] ABSTRACT

A tape recorder provided with a reversible predetermined electronic counter which functions to give a control signal used to stop the tape at a predetermined position.

1 Claim, 1 Drawing Figure

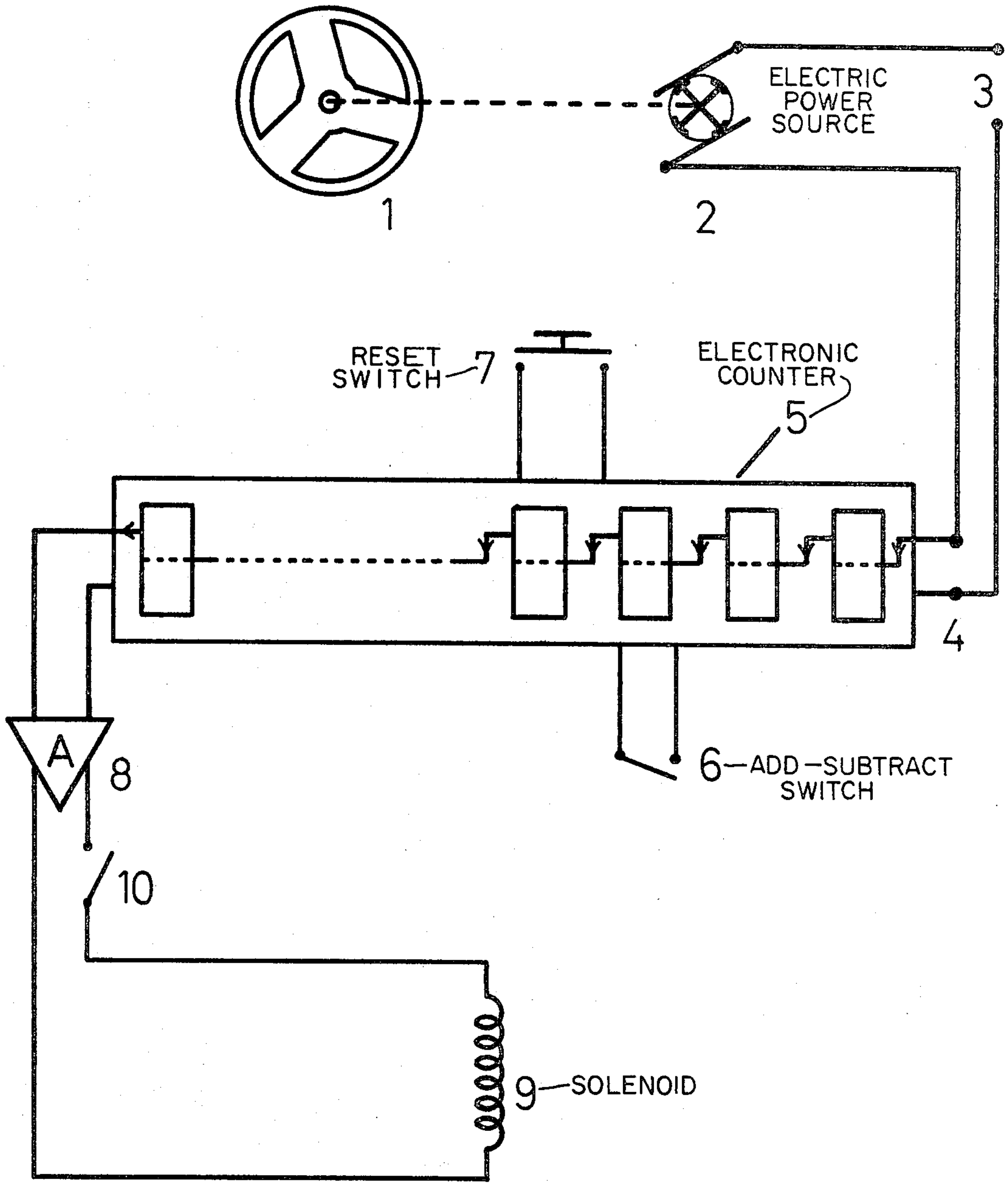
ELECTRIC
POWER
SOURCE
3
1
2
RESET
SWITCH
7
ELECTRONIC
COUNTER
5
4
A
8
6—ADD—SUBTRACT
SWITCH
10
9—SOLENOID

TAPE POSITION MARKING AND SENSING DEVICE

This invention relates to a tape recorder tape position sensing device used to actuate the popular Automatic Reverse devices and similar devices, and more particularly to a sensing device consisting of an electronic revolution counter.

The Automatic Reverse, Automatic Stop, Automatic Repeat devices, etc, for tape recorders have proved popular, but their operation depends on some type of sensing device which signals the approaching end of the tape. As the end of the tape approaches, the sensing device directly or indirectly passes electrical current to a solenoid which is linked with the tape recorder mechanism in such a way that when the solenoid is energized, the tape transport mechanism stops or reverses.

Prior sensing devices (several types are used in present day tape recorders) display one or more of the following disadvantages, depending on the type.

1. Expensive.
2. Require some special preparation of the tape, such as attaching a piece of metal foil to the tape or prerecording a tone on the tape at the desired "Stop" point.
3. Require special electronic circuits to record and later to sense a tone "Stop" signal on the tape.
4. Lacking precision; do not stop or reverse tape at exactly the desired point.
5. Lacking flexibility; the desired "Stop" point on the tape, once marked, is difficult or impossible to change.
6. Load the tape transport mechanism with a mechanical revolution counter. Some Hi-Fi enthusiasts feel that such loading causes a loss of fidelity.

The object of the present invention is to provide tape recorders with a tape position sensing device which overcomes most or all these disadvantages.

This and other objects are accomplished by the parts, improvements, combinations and arrangements comprising the invention, a preferred embodiment of which is shown by way of example in the accompanying schematic drawing showing the reel actuated pulse generator feeding the electronic counter input, and the counter output controlling an actuating solenoid, and herein described in detail. Various modifications and changes in details of construction are comprehended within the scope of the appended claims.

The invention may be defined in general terms as comprising an electronic revolution counter linked with one of the tape reels of a tape recorder in such a way as to indicate a number proportional to the number of reel revolutions; when the counter indicates a certain predetermined number, sensing that a certain point on the tape has been reached, the output circuit of the counter delivers electric current to the tape recorder "Stop" or "Reverse" solenoid.

Reference is made to the following drawing:

The drawing shows one of the tape reels 1 of a tape recorder, mechanically linked with a rotary switch or commutator 2 which makes and breaks contact as the tape reel turns, interrupting the current flow from power source 3, thereby sending a series of pulses into the input terminals 4 of counter 5.

The commutator shown makes and breaks the circuit four times per reel revolution, therefore the desired "-Stop" position on the tape will be sensed accurately within ¼-reel revolution. A greater number of commutator segments results in stopping or reversing the recorder more precisely at the desired position; it also requires more stages in the counter.

(In a binary counter, the number of stages necessary to count to a given number X is $n=\log_2 X$. If our tape recorder uses tape reels containing 1000 turns of tape, and we use a four-segment commutator, the count would go as high as 4000, and the number of counter stages would be 12. But in this sensing device, one more stage is needed as a control stage, making 13 stages in all.)

Counter 5 is a conventional electronic binary pulse counter. It counts upward (ADDing 1 each time a pulse is received) 0---0000, 0---0001, 0---0010, 0---0011, 0---0100, etc, when add subtract switch 6 is open; it counts downward (SUBTRACTing 1 each time a pulse is received) ------, 0---0100, 0---0011, 0---0010, 0---0001, 0---0000 when switch 6 is closed. The counter CLEARs or RESETs when pushbutton 7 is pressed. (Ordinarily, we reset such counters to 0---0000, but in this special application, we reset it to 1---1111.) Such counters are widely used nowadays, so no explanation of counter theory is necessary here. (Since no visual indication of the count is necessary, we're being pretty arbitrary about which number is 1 and which number is 0, which way is up, and which number is positive.)

We shall assume that our tape recorder is so arranged that the counter counts up when the tape is moving to the right, and counting down when the tape is moving to the left. Then switch 6 is linked to the tape recorder controls (push buttons or rotary control knob) in such a way that when the tape is moving to the left, switch 6 is closed, causing the counter to count down. Switch 6 is open (counter counting up) when the tape is moving to the right and when the recorder is stopped.

Since the first stage of counters counts the last digit of the number, vice versa, hereafter we'll refer to the "-first digit stage," which is actually the last stage of the counter, which acts as the control stage. Since this is the extra stage we mentioned before, (one stage more than is needed to count all the turns of tape on the reel) this stage never counts a 1 when the counter is counting up. However, when counting down, the next number after 0–0000 is 1–1111, our first digit stage shows a 1, indicating that we have passed zero and the count is now negative. This first digit "1" then, is the impulse which tells the "Stop" or "Reverse" solenoid 9 the time has come to stop the recorder. The output from the first digit stage being too small to operate solenoid 9 directly, an amplifier 8 is inserted in the line. When the recorder stops, contact 10 opens, stopping further flow of current through the solenoid. Solenoid 9 and contact 10 are common to most present-day "Auto-stop" and "Auto-reverse" devices, so no further explanation of their action is necessary.

Suppose, for example, the operator wants to make a recording, for immediate replay. Naturally, he wants the "Play" operation to begin at the same point on the tape where the recording begins. So he uses the Automatic Rewind Stop function in this way:

Assuming tape and reels in place on the recorder, our operator can begin the recording at any place on the tape: at the beginning of the tape near the leader, or even in the middle of the tape, but first:

1. He presses the "MARK" button, (contact 7) which resets the counter to 1---1111, (Resetting the counter to 1---1111 "marks" this point on the tape, and later, when rewinding, the tape will stop rewinding at this point.)
2. He begins the recording. As the recording progresses, the counter counts reel revolutions (or in our example, quarter revolutions) 1---1111, 0---0000, 0---0001, 0---0010, 0---0011, etc, to the end of the recording.
3. He stops the recorder.
4. He begins "Rewind" operation. As the tape rewinds, the counter counts down, --- --- --- 0---0011, 0---0010, 0---0001, 0---0000, 1---1111. At this point, the "1" in the first digit stage sends an electric current to the "Stop" solenoid, stopping the recorder.
5. The tape is now in position to play from almost exactly the beginning of the recording.

What I claim is:

1. In combination with a tape recorder of the type that includes a rotatable tape reel and a solenoid actuated tape recorder function control, the improvement comprising an electronic pulse counter that includes means for selectively increasing and decreasing the count thereof on the feeding of electrical pulses thereto, said counter also including means for resetting the count thereof to a predetermined count, means operatively connected to the counter for energizing the solenoid upon the counter arriving at said predetermined count, and means having an operative connection to said tape reel for producing and feeding electrical pulses to the counter for counting as a function of rotation of the tape reel, whereby the tape recorder function control can be caused to be actuated upon the tape reel being rotatively restored to a position previously occupied thereby corresponding to the predetermined count of the counter.

* * * * *